Aug. 10, 1943.  A. KULLMAN ET AL  2,326,368
GEAR FORMING MACHINE
Filed Nov. 29, 1938  4 Sheets-Sheet 1

INVENTORS
Alfred Kullman
Charles Black
BY
Woodward ATTORNEYS

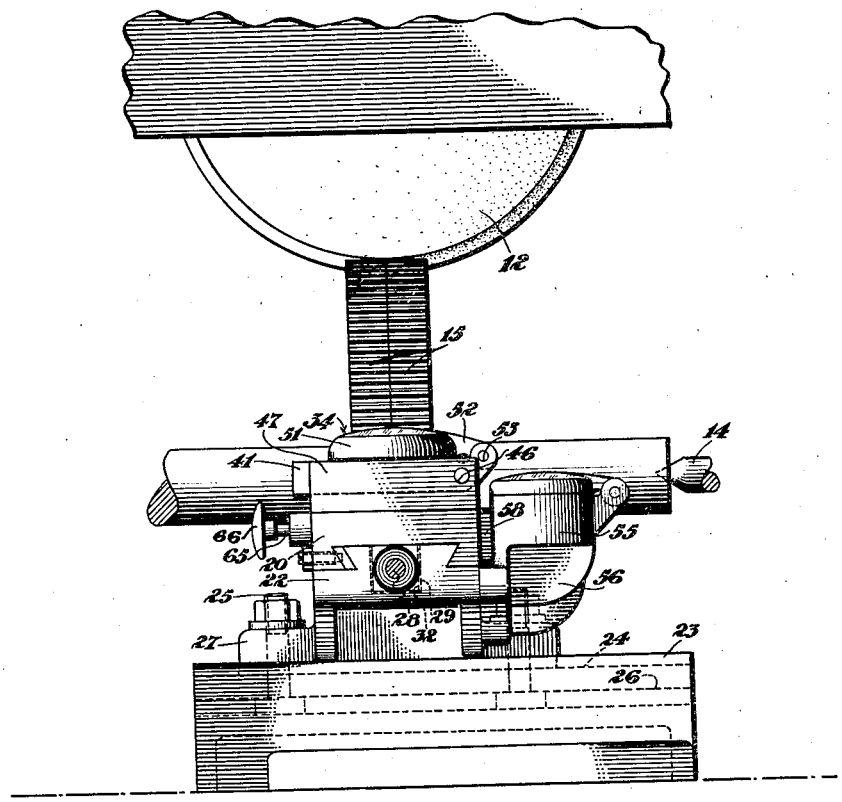

Aug. 10, 1943.　　A. KULLMAN ET AL　　2,326,368
GEAR FORMING MACHINE
Filed Nov. 29, 1938　　4 Sheets-Sheet 4

INVENTORS
Alfred Kullman
Charles Black
BY
Wood & Wood ATTORNEYS

Patented Aug. 10, 1943

2,326,368

UNITED STATES PATENT OFFICE 2,326,368

GEAR FORMING MACHINE

Alfred Kullman and Charles Black, Cincinnati, Ohio, assignors to The American Tool Works Company, Cincinnati, Ohio, a corporation of Ohio Application November 29, 1938, Serial No. 242,967

6 Claims. (Cl. 51—165)

This invention relates to gear grinding, shaving, or cutting machinery, and is particularly directed to the art of testing or checking gears which are being formed, as to size, runout, and tooth contour.

In the past, it has been necessary to remove the gear, being formed, from the machine and to place it in a gear testing fixture in order to inspect it for size, runout, and tooth contour. If the inspection showed that additional work was necessary, the operator placed the gear back in the machine. Now, in setting the gear back in the machine, there has always been the difficulty of correctly locating the gear so that the metal would be removed uniformly from each side of the tooth. This is a prerequisite to the production of an accurate gear.

Also, for example, in the case of a grinder, it has been necessary for the operator to rely exclusively on the micrometer screw of the grinder for lowering the grinding wheel sufficiently to remove the final amount of stock. The wear of the grinding wheel, due to wear while making the cuts, and inaccuracies in the screw, have been conditions making it difficult to produce a gear which is really of the proper size.

Finally, the first gear had to be inspected for size before the machine operator would know how much to lower the grinding wheel for sizing the next gear. This involved a loss of productive time, and again the screw inaccuracies and wheel wear prevented the second gear from being properly ground in the machine.

It has been the object of the present inventors to provide means in a gear forming machine for checking the size, runout, and tooth contour of the gear concurrently with the forming of the gear. This objective has resulted in a novel combination wherein the work can be continued until it is indicated that the gear is accurately produced and regardless of the inaccuracies occurring because of wear of the machine parts. After the gear is removed from the machine, no further inspection is necessary, as the apparatus has indicated fully to the operator the trueness of the gear.

It has been the further object of the inventors to provide a gear forming machine, including means of this character, which is capable of concurrently testing and indicating the amount of metal yet to be removed, which means will operate with respect to gears in a wide range of sizes. Furthermore, the present invention greatly facilitates the operation of inserting the gear on the arbor; that is to say, the concept has resulted in a construction wherein the testing element, after setting, may be drawn back clear of the arbor and held in position, while the gear is being placed on the arbor. After the gear is in position, the element is permitted to move into engagement.

It has been a still further object of the present inventors to provide a gear testing apparatus which is unusually accurate in its operation, which is universally applicable to gears within a given range, and which is easily set to test any gear within a wide range.

Other objects and certain advantages will be more fully apparent in a description of the accompanying drawings in which:

Figure 3 is an end view of the apparatus looking toward the arbor and grinding wheel of the grinding machine.

Figure 4 is a sectional view taken on line 4—4, Figure 1, illustrating the details of construction of the testing apparatus.

Figure 1:
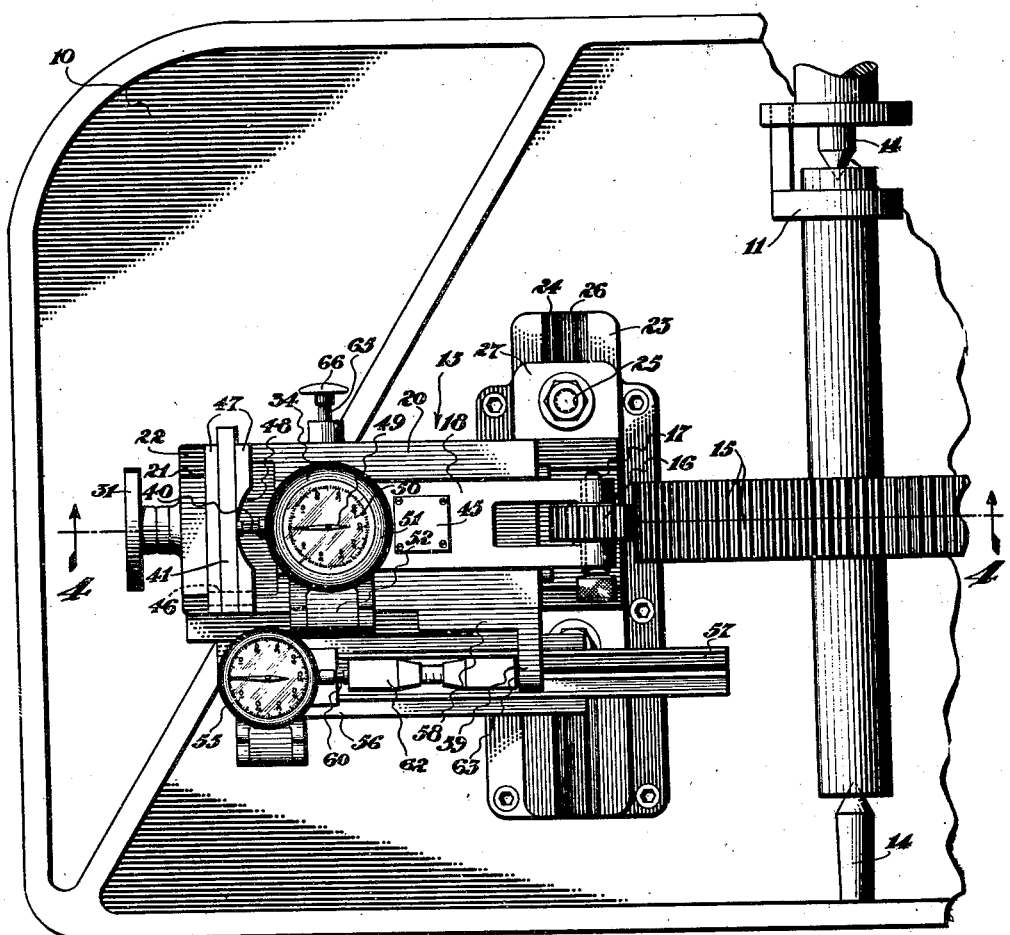
Figure 1 is a fragmentary top plan view of a portion of a grinder incorporating the present improvements and showing the apparatus in position when the work on the gears is finished.
Figure 2:
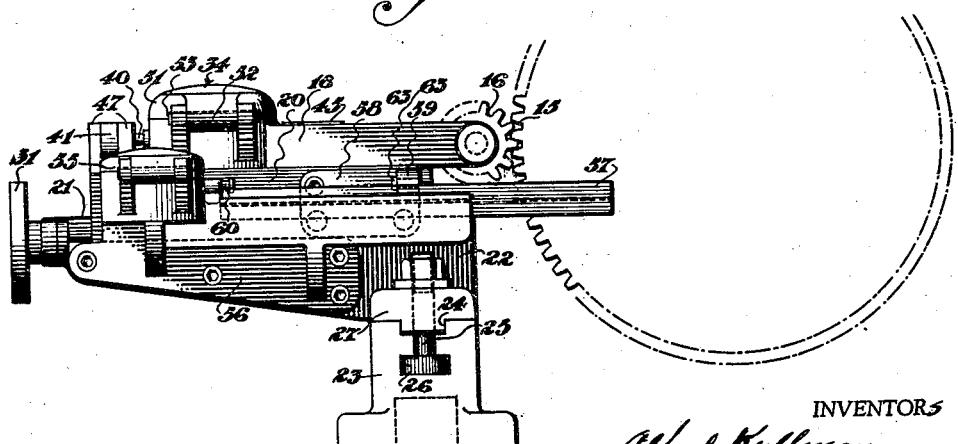
Figure 2 is a side view of the machine of Figure 1, showing the testing apparatus in relation to the gear.
Figure 5:
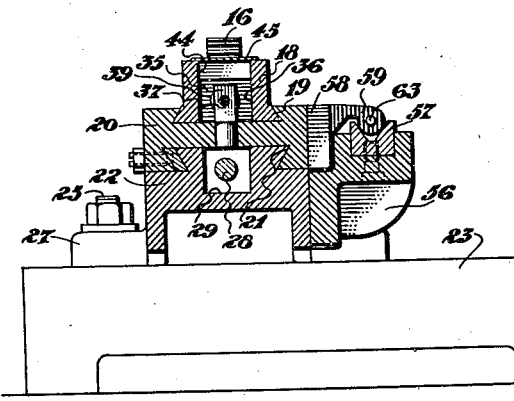
Figure 5 is a sectional view taken on line 5—5, Figure 4, showing further details.

The improved machine generally described, includes a master gear carried by a slide and disposed in constant rolling mesh with the gear being ground. An indicator dial is disposed on the slide and is operated by movement of the slide to indicate change of position of the master gear with respect to the gear being ground. Originally set to zero, with the master gear in mesh with the master gear matching the gear to be ground, this indicator will show deviations from trueness in graduations varying from zero. When the indicator remains at zero, plus or minus the allowed tolerance for a complete revolution of the gear, the operator knows that the gear is right.

It is arranged that a single set of master gears or discs may provide for setting of the testing device for any size of gear to be ground within the range of the device. For this purpose, an auxiliary indicator is provided and the slide is reset with respect to this indicator by means of a measuring rod and a micrometer, after the slide has been set to zero for the master gears or discs. Any set of master gears of known pitch diameter of discs of known diameter are first mounted on the work arbor and slide spindle. Both indicators are set at zero, the auxiliary indicator being held in compression by the conventional measuring rod or rods and an end measuring micrometer. The measuring rod or rods and micrometer are set to compensate for the difference in distance between the centers of the set-up mating masters and the centers of the gear of final size and the testing mating master carried by the slide. The position of the slide is then changed to set the auxiliary indicator back to zero. It will be apparent that either discs or master gears may be used in initially setting the slide.

Referring specifically to the drawings, the bed of a grinding machine is indicated at 10. The work arbor is shown at 11 and the grinding wheel at 12. The testing apparatus, indicated at 13, is permanently fixed to the bed of the machine adjacent the arbor. The arbor is mounted on the conventional centers 14 and carries the gear or gears to be ground, indicated at 15. The master gear 16 of the device is journalled on a short shaft 17 in the bifurcated forward end of the upper slide 18. The shaft 17 includes a knurled head facilitating removal of the shaft for dismounting the gear. The slide 18 is mounted for translative movement on the dovetail way 19 of the main slide element 20. The main slide element 20 is mounted for translative movement on the dovetail 21 of the slide support element 22. The slide support element 22 is mounted for lateral adjustment on a base 23 in a slot 24 thereof. T-bolts 25, engaged in a T-slot 26 of the base, traverse the attachment lugs 27 of the slide support 22 and fix the slide support in any desired lateral position.

The slide 20 is adjustably mounted in the way of the slide support 22. The adjustment is procured by means of a screw 28 disposed through a clearance slot 29 of the support parallel to the way. This screw is rotatably journalled at the forward end of the support in a bushing 30 and has a hand wheel 31 fixed on its extended end. The screw traverses a nut 32 fixed to the slide by screws 33.

The slide is sectional, and the upper member 18, which carries the indicator 34, has a predetermined amount of movement relative to the main slide element 20. For this purpose, the element 18 is mounted in a dovetail slideway 19 in the slide element 20. A lug 35 is fixed on the slide element 20. It projects upwardly into a cavity 36 in the underside of the element 18. A centering stud 37 is fixed in one side of the lug adjacent to and axially aligned with another stud 38 fixed in the opposing wall of the cavity. A coil spring 39, under compression, is centered upon these studs between the lug and the mentioned wall. Thus, the slide element 18 is constantly urged inwardly and the dial indicator 34 is released. This spring is effective for constantly urging the master gear against the gear being tested and, as the gear is ground, relieves the contact of the indicator stem 40 with the abutment gate 41, whereby the indicator moves toward zero position.

An opening 44 is provided in the top slide section 18 providing access to the cavity 36 for insertion of the spring 39 into position. This opening is closed by means of a cap 45.

The gate 41, which abuts the stem 40 of the gauge, is pivoted on a pin 46 and drops into position between parallel transverse lugs 47—47. The inner lug 47 is cut away, as at 48, to permit the stem to engage the gate. The gauge includes an indicator finger 49, operating with respect to a circular dial 50, the readings of which range from zero up to fifty in either direction. The finger is operated, by means of the stem, against constant pressure means within the gauge (not shown). By moving the stem a definite amount, the finger will be moved to zero position. The mechanism of the gauge is built into the top slide section and is covered by means of a cover plate 51, hinged on a lug 52 on a pin 53.

As previously stated, the mechanism, described thus far, would require mating master gears for each size of gear to be ground. Obviously, a great many master gears would be required and the expense would be high when the work is in small lot quantities and of big variety.

Accordingly, the device is provided with an auxiliary mechanism which reduces tooling to a minimum. A second dial indicator 55 is provided. This dial indicator is of the same type as the main one and is mounted on a bracket 56 fixed to the side of the base 23 and including a trough 57. A bracket 58 is fixed to the saddle or slide 20, which carries the upper or master gear carrying slide 18. This bracket provides a lug 59 extending to a position over the trough. The stem 60 of the second dial indicator projects toward this lug, and a measuring rod or rods 61 and a micrometer 62 are inserted between the stem and the contact point 63 of the bracket.

Now in setting up the device for any given piece of work, any two discs of known diameter (see Figure 8) or any set of master gears of known pitch diameter are mounted on the work spindle or arbor and the slide, as described heretofore. Now, the slide is adjusted to set the first indicator 34 to zero and the second indicator 55 is set at zero by placing the conventional measuring rods and end measuring micrometer in the trough 57. Appropriate adjustments are made on the micrometer to bring the second indicator to zero.

Knowing the final pitch diameter of the gear to be ground and the pitch diameter of the mating master, the measuring rods and micrometer are changed and reset, after removal of the master gears, to compensate for the difference in centers. The position of the saddle or slide is then changed, the rods and micrometer inserted in the trough, and the slide adjusted, to bring the second dial indicator back to zero. Thereupon, the work, to be ground, and the mating master, are substituted for the discs. The device is then ready to indicate the size of the work, as it is being ground, by reference to the first indicator 34.

Figure 6:
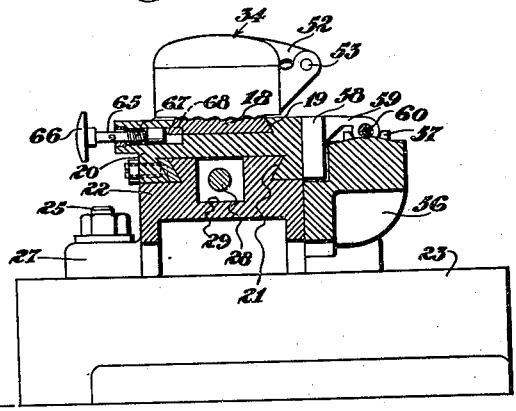
Figure 6 is a sectional view taken on line 6—6, Figure 4, showing the detent, which is adapted to hold the main dial slide in drawn back position, in released position while the gear is being ground and checked.
Figure 7:
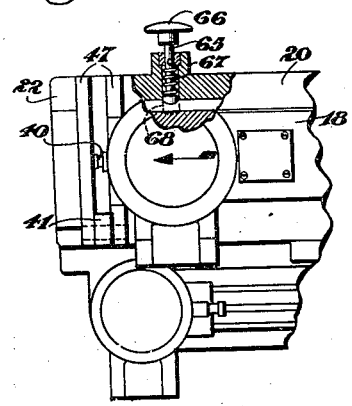
Figure 7 is a fragmentary top plan view of a portion of Figure 1, illustrating the slide locked back and out of use, while the gear, to be ground, is being placed on the arbor.

When the operator wishes to insert the work on the arbor, he can move the slide back and lock it in position by means of the locking detent pin 65 detailed in Figures 6 and 7. This detent pin provides an operating head 66 and a spring-urged inner end 67 normally riding against the side of the top slide. This pin drops into a notch 68 in the slide, when the slide is drawn back to the position shown in Figure 7, and after the gate 41 has been lifted.

Figure 8:
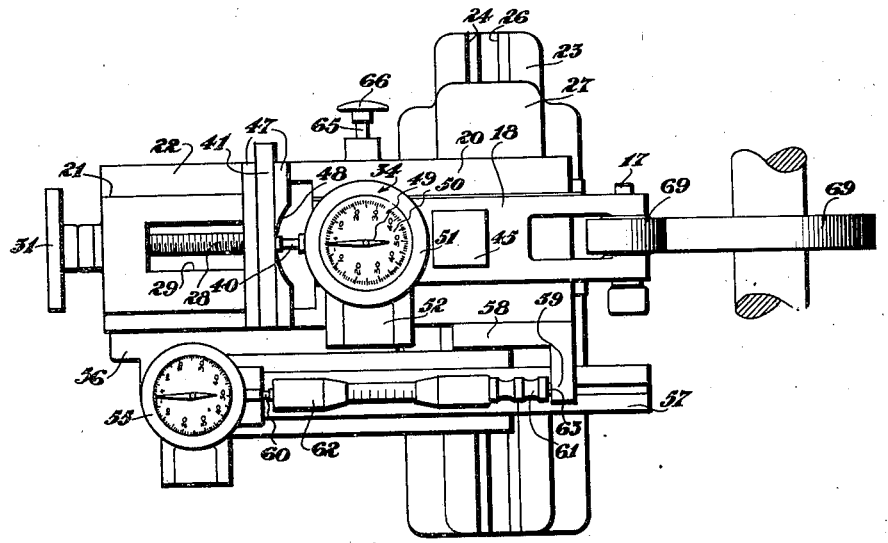
Figure 8 is a top plan view taken similar to Figure 1 but showing the apparatus in initial position as determined by master discs and also illustrating the operation and use of the auxiliary dial.
Figure 9:
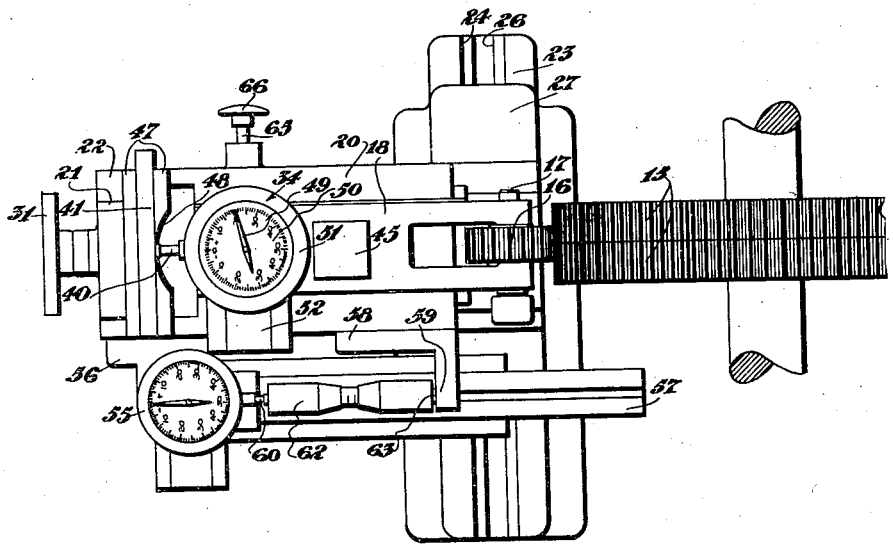
Figure 9 is a view taken similar to Figure 8 but showing the apparatus in position just after the gears, to be ground, have been placed on the arbor, the view illustrating an average amount of metal to be removed.

It is believed that reference to Figures 8 and 9 will make clear the operations of setting up the machine for a given gear grinding operation. The master discs 69, 69 are shown in position. The gate 41 is down and the first dial 34 is at zero. The slide or saddle has been moved forwardly so that zero reading is obtained by appropriate contact between the master discs. The measuring rod and the micrometer are in the trough, and the micrometer has been adjusted so as to set the second dial at zero.

Thereupon, the measuring rod is removed, in this case, and the micrometer changed so that the total length of the micrometer is less than the total length of the previously set micrometer and the measuring rod by a distance exactly equal to the difference between the centers of the master discs and the centers of the master gear and a gear of the finished size.

Now, as shown in Figure 9, the rough gear or gears 15, 15 are in place. The engagement of these gears with the master gear on the slide, of course, moves the first indicator 34 from zero, and indicates, on the graduations, the amount of material to be ground. This movement of the slide is only a movement of the top section thereof. The main section of the slide will remain in fixed position. Obviously, the operator can remove the micrometer for he then knows that the slide has been properly set.

It might be added that Figure 1, illustrates the position of the gauges when the work has been fully ground. By watching the first gauge, the operator is able to tell just when the grinding is approaching completion. Specifically, he can determine the amount of runout, and the size and is able to detect any inaccuracy as to each tooth.

Having described our invention, we claim:

1. In a device for testing a gear being ground, a slide, a gear mounted on the slide in rolling mesh with the gear being ground, a gauge mounted on said slide including an indicator, said gauge including a stem for operating the indicator, an adjustable slide carrying said first named slide, a removable abutment for said stem mounted in said second slide, and spring means between said slides for urging said first named slide toward the gear being ground, whereby, as the first named slide moves toward the gear being ground, the indicator approaches zero.

2. In a device for testing a gear being ground, a compound slide, one element of which is adjustably mounted, and the other element of which is movable relative to the first and carries a master gear disposed in mesh with the gear being ground, an indicator mechanism carried by said first mentioned element and operated by movement of the second mentioned element, an extension on said first mentioned element, a second indicator mechanism, and a support for a measuring instrumentality adapted to be disposed between said extension and said second indicator means, whereby the compound slide may be reset, after initial setting, a predetermined, measured amount as determined by change in the measuring instrumentality.

3. In a gear forming machine, means for rotatably supporting a gear to be formed, means for forming said gear, a slide mounted thereon, a master gear mounted on the slide in rolling mesh with said gear to be formed, a gauge operated by said slide, said gauge including a stem for operating the pointer thereof, an adjustable slide carrying said first named slide and providing an abutment for said stem, and spring means between said slides for urging said first named slide toward the gear being ground, whereby, as the first named slide moves toward the gear being formed, the pointer approaches zero.

4. In a grinding machine, a base, an arbor for supporting a gear to be ground, means for grinding the teeth of said gear, a slide mounted on said base, a master gear adjustably mounted on said slide and disposed in mesh with the gear being ground, and a dial operated by said master gear for indicating the runout, the variations from finished size, and variations in contour of the teeth of the gear.

5. A device for testing the trueness of the teeth of a gear being formed, comprising, a base, a slide mounted on the base, a gear mounted on the slide in rolling mesh with the gear being formed, a second slide carrying said first-named slide, an indicator operated by relative movement of said slides, spring means between said slides for urging said first-named slide toward the gear being formed, means for adjusting and fixing the position of the second-named slide, a second indicator mounted on the base, a projection from the second-named slide, and a means for supporting a measuring instrumentality between the extension and said second indicator.

6. In a gear forming machine, a base, an arbor for supporting a gear, means for removing metal from the teeth of said gear, a slide mounted on said base, a master gear mounted on said slide and disposed in mesh with the gear, and a dial operated by said slide for indicating the trueness of the teeth of the gear.

ALFRED KULLMAN.
CHARLES BLACK.